US005486287A

United States Patent [19]
Murphy et al.

[11] Patent Number: 5,486,287
[45] Date of Patent: Jan. 23, 1996

[54] WASTEWATER STRAINING DEVICE

[75] Inventors: Gary Murphy, San Diego; Raymond Matthias, Vista, both of Calif.

[73] Assignee: Murphy Marketing, Inc., San Diego, Calif.

[21] Appl. No.: 317,138

[22] Filed: Sep. 26, 1994

[51] Int. Cl.⁶ .................................................. B01D 29/35
[52] U.S. Cl. ......................... 210/164; 210/238; 210/452
[58] Field of Search ...................................... 210/470, 452, 210/163, 164, 165, 482, 238, 232; 55/422, 484

[56] References Cited

U.S. PATENT DOCUMENTS

| | | |
|---|---|---|
| Re. 31,561 | 4/1984 | Thompson . |
| 1,035,733 | 8/1912 | Pierce . |
| 1,675,714 | 7/1928 | Koch ................................. 210/452 X |
| 2,505,305 | 4/1950 | Schaefer . |
| 3,713,539 | 1/1973 | Thompson . |
| 4,207,631 | 6/1980 | Baggey . |
| 4,301,557 | 11/1981 | Walraven . |
| 4,321,713 | 3/1982 | Thompson . |
| 4,419,232 | 12/1983 | Arntyr et al. . |
| 5,284,580 | 2/1994 | Shyh . |

FOREIGN PATENT DOCUMENTS 2165146A  4/1986  United Kingdom .

OTHER PUBLICATIONS

Innovative Mfg. Co., Inc. Brochure Describing Floor Sink Strainer, Los Angeles, Calif.

Primary Examiner—Frank Spear
Attorney, Agent, or Firm—Peter K. Hahn

[57] ABSTRACT

A strainer device for preventing particulate matter from entering a drain system is provided. The device includes a strainer frame including a box portion and a flange portion. The box portion includes a primary outlet for liquids which is covered by a filtering device. Additionally, the box portion includes at least one secondary outlet along a side wall of the box portion, which is also covered by a filtering device. The present strainer device is designed such that when the primary outlet becomes clogged, liquid can flow through at least one of the secondary outlets. The flanged portion of the device is designed to overlap and extend beyond the sink or receptacle in which the strainer device is placed. The annular flange defines the inlet of the strainer device and includes a tapered portion and a grate recess in which a grate can be placed.

20 Claims, 3 Drawing Sheets

WASTEWATER STRAINING DEVICE

TECHNICAL FIELD

The present invention pertains to a device for removing particulate matter from a stream of liquid. More particularly, the present invention relates to a wastewater screening device which removes unwanted particulate matter from a wastewater stream. The present invention is particularly, but not exclusively, useful for preventing particulate matter from entering the drain of a floor sink.

BACKGROUND OF THE INVENTION

Commercial and residential sinks are typically connected to a wastewater pipe system which eventually empties into a sewer system of some sort. A problem common to sinks and wastewater drain systems is that material can accumulate in the sink, its drain and/or the wastewater piping system which prevents the wastewater from advancing through the system.

The problems associated with clogged sinks and drain systems is particularly acute in commercial restaurant establishments. In these establishments, not only is a large volume of liquid processed through the wastewater system, but typically also a large amount of debris such as food particles, packaging materials, etc., is placed into the wastewater stream. Because of the narrow nature of the sink drain opening and/or the wastewater piping system, these drains and pipes repeatedly become clogged. Once the drain or the piping system becomes clogged, the time-consuming and often costly chore of removing the clog becomes necessary.

It has been found that the best way to prevent the clogs, and thus the necessity for removing the clogs, is to prevent material from entering the drain and/or the wastewater piping system.

In the past, a number of devices have been utilized to prevent unwanted material from entering the drain and/or piping system. The oldest and most common method of preventing particulate matter from entering the drain and/or piping system is to place a substantially hemispherical strainer device into the drain of a common sink. The drawbacks of this device are readily apparent.

First, the area through which the wastewater must travel is relatively limited. This results in even a small amount of particulate matter being able to clog the strainer, which in turn results in a back-up in the sink.

Second, once the liquid is backed up, the strainer must be removed by placing one's hand into the backed-up sink to pull the hemispherical-shaped strainer from the drain area. Not only is this an undesirable chore, but the end result is often also equally unacceptable. More specifically, when the dome-shaped strainer is removed from the drain area, the liquid flow rushes around and past the dome taking the debris collected on the dome down into the drain and into the piping system.

Alternative strainer systems are known which recognize the shortcomings of the hemispherical dome and attempt to present a better solution to the problem of debris entering the drain system. One such device is set forth in U.S. Pat. No. 3,713,539 issued on Jan. 30, 1973, to Thompson, et al. In this patent, a strainer device for use in drainage receptacles is set forth. The strainer device is removably mounted adjacent to the upper portion of the drainage receptacle and is adapted to captively retain foreign material entering therein. A substantially similar straining device is utilized and set forth in U.S. Pat. No. 4,321,713 issued on Mar. 30, 1982, to Thompson. In each of these devices, a flat, square frame member is utilized to support a piece of stainless steel screen. This device is a dramatic improvement over the hemispherical dome but likewise has substantial drawbacks.

First, the use of a single piece of screen material as is set forth in each of the two patents still significantly limits the surface area of the straining member. The limitation of the surface area is controlled by the amount of stretch that can be maintained in the screen itself. If the screen is stretched too much, the gaps between the wire components of the screen become too large and the screening efficiency is decreased. The inevitable end result is a relatively shallow, low surface screen.

Not only does the shallow screen result in a reduced surface area for the screen, but it also results in the straining device being able to hold only a small quantity of particulate matter. This means the screen quickly becomes filled and clogged, which necessitates repeated removal and cleaning to prevent a backup.

Still further, the prior screen devices do not include a handle or other means by which the unit can be removed from the sink area. Accordingly, the person removing the device must reach into the debris and gunk captured by the strainer to remove the strainer from the sink.

In light of the foregoing, it is an object of the present invention to provide a device for removing particulate matter from a stream of liquid. It is another object of the present invention to provide a straining device for use with residential and commercial sinks, floor sinks and roof drain systems. Still further, it is an object of this invention to provide a straining device having a large straining surface area. Yet another object of this invention is to provide a straining device which can easily be removed from the sink or receptacle in which it is used. It is yet another object of the present invention to provide a relatively large collection area for the particulate matter such that as the particulate matter builds up and prevents flow through one portion of the screening device, flow is redirected to exit the strainer through another area thereby maximizing flow for a greater period of time. It is yet another object of the present invention to provide a strainer which can be set into a floor sink in a manner such that the overlapping, flanged portion of the straining device is tapered to allow sweeping of debris into the straining device. Additionally, it is an object of the present invention to provide a grating system that can be used with the straining device should the sink be in an area of high traffic. Still further, it is an object of the present invention to provide a device that is relatively easy to manufacture and which is comparatively economical.

SUMMARY OF THE INVENTION

A device for removing particulate matter from a stream of liquid is provided by the present invention. The strainer device generally consists of a strainer frame, including a base portion, an annular flange portion substantially parallel to the base portion, and four side walls interconnecting the base portion and the annular flange portion. In this manner, a substantially box-shaped member is provided which is attached to an annular flange portion. The device is designed such that the annular frame portion surrounds the inlet area of the device and the base portion provides an opening which is the primary outlet of the device. Secondary outlets are provided in the device in the side walls. Both the primary outlet in the base member and the secondary outlets in the side walls are typically covered by a filtering material which can be either a screen member or a perforated metal plate. In order to facilitate removal of the device from the sink, a handle is attached to the frame.

The strainer device is designed to receive one or more grate members to allow the device to be used in high-traffic areas. Additionally, the flange portion of the device is typically designed to extend out beyond the periphery of the sink in which the device is used. Preferably, the flange member is tapered to allow debris in the area of the sink to be swept into the straining device. The novel features of this invention, as well as the invention itself, both as to its structure and its operation, will be best understood from the accompanying drawings, taken in conjunction with the following description, in which similar reference characters refer to similar parts, and in which:

DESCRIPTION OF THE PREFERRED EMBODIMENTS

Figure 1:
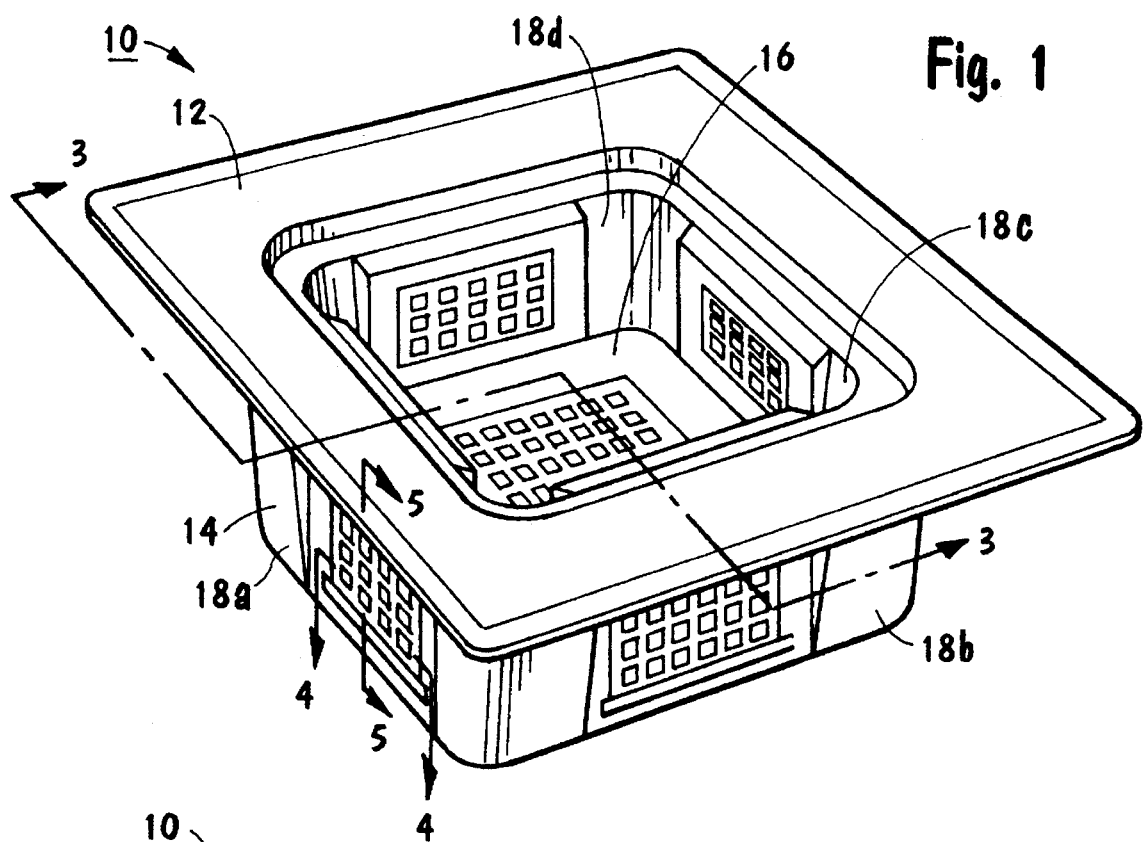
FIG. 1 is a perspective view of the present straining device.

Referring initially to FIG. 1, the strainer device of the present invention is shown and generally designated 10. The strainer device 10 is comprised of a frame 11 which includes an annular flange portion 12 and a box portion 14. Box portion 14 is comprised of a base 16 and four interconnected side walls 18a–d. The side walls 18a–d will collectively be referred to hereinafter as side walls 18.

Figure 2:
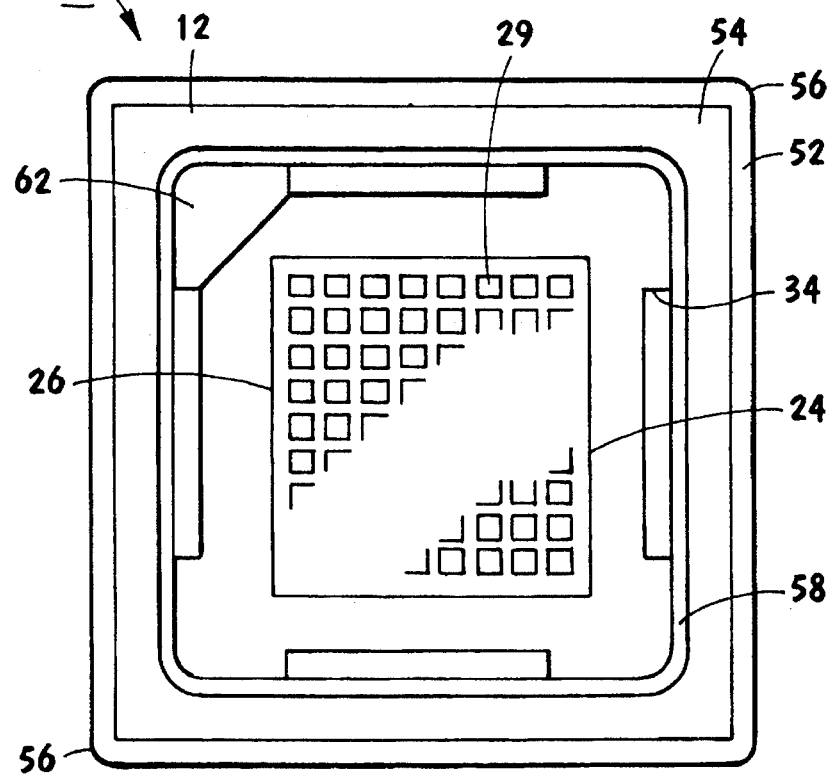
FIG. 2 is a top view of the present straining device.
Figure 3:
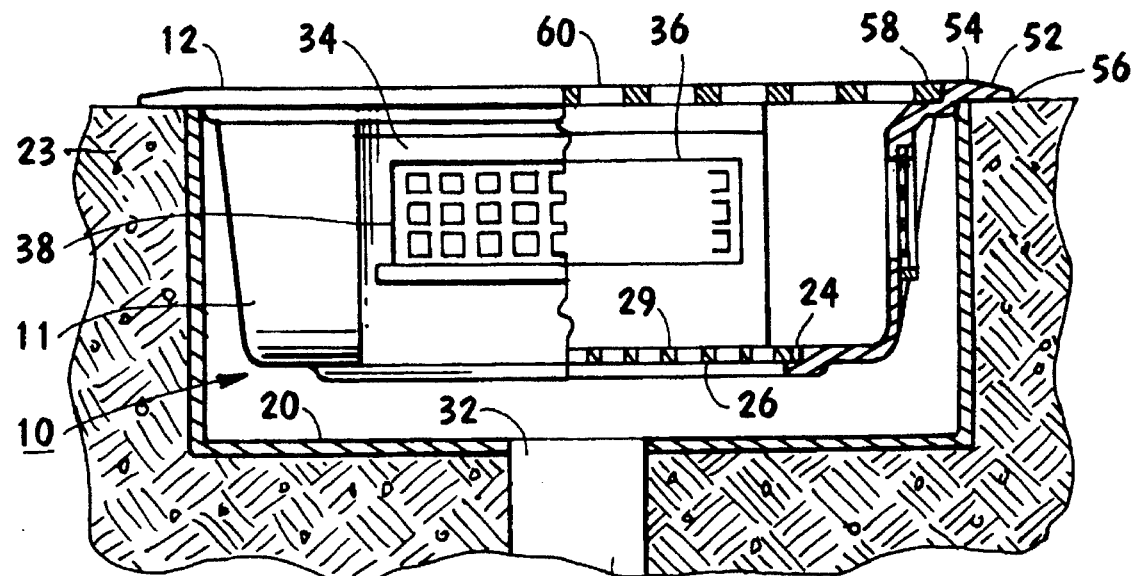
FIG. 3 is a partial cutaway side view along the line 3—3 shown in FIG. 1 showing the present straining device in place in a common floor sink.

Details of the present invention can best be seen by cross-reference between FIG. 1, FIG. 2 and FIG. 3. FIG. 2 is a top view of the present device, while FIG. 3 is a partial cutaway view of the present device shown installed in a typical floor sink 20. Sink 20 is connected to drain 22, which is set in the ground 23. As is best seen in FIG. 2, base 16 includes a center recess 24 which defines base opening 26. Base opening 26 operates as the primary outlet of device 10. While the particular base opening 26 shown is generally rectangular, the openings could just as easily be square, circular or any other shape without departing from the spirit and scope of the present invention.

Placed into center recess 24 is a center strainer 28 which effectively covers base opening 26 and acts as a filter. Center strainer 28 is preferably a perforated steel plate but can also be another screening device such as a screen mesh or other screening and filtering meshes known to those skilled in the art. The preferred center strainer screening device would have screen openings 29 sized to prevent the passage of material as small as a tomato seed. The screen openings 29 ordinarily have diameters in the range of 0.5–1.5 mm and more preferably 0.9–1.1 mm. Preferably, strainer 28 will have between 35 and 95 openings per square centimeter. If a screen mesh-type center strainer 28 is used, it is preferred that the wire used in the screen mesh is in the range of 0.025 to 0.030 inches and, optimally, 0.028 inches in diameter. Additionally, the wire-to-wire opening distance is preferably in the range of 0.04 inches to 0.065 inches and, optimally, 0.0553 inches. Whether using the perforated metal plate or the wire screen mesh, it is preferred that the percentage of openings area will be in the range of 38 to 55% and optimally 44% of the area of the base opening 26. Center strainer 26 can be held in place in recess 24 by bonding, gluing, riveting, or other fastening means. Alternatively, an additional retaining member may be placed such that the center strainer 26 is sandwiched between the base 16 and the retaining member. This retaining member could then be bonded, glued, riveted, etc., to base 16 to cooperatively maintain center strainer 26 in center recess 24. Naturally, as those skilled in the art will appreciate, the center strainer 26 will preferably be shaped to fit the opening which, as indicated above, can be not only rectangular, but also square, circular as well as other shapes.

With this configuration, a flow of liquid containing particulate matter can enter the straining device through the inlet formed by the annular flange and can exit the straining device 10 through base opening 26. As the stream of liquid passes through base opening 26, it is strained or filtered by center strainer 26 such that particulate matter being carried along by the stream of liquid is retained by the center strainer 26 while still allowing the substantially particulate-free liquid to pass and enter sink 20 and subsequently enter drain 22.

Importantly, the surface area of center strainer 26 is preferably several orders of magnitude greater than the cross-sectional area of the sink outlet 32. In this manner, center strainer 26 will not become clogged with particulate matter as easily as would a straining device placed into sink outlet 32.

As those skilled in the art will appreciate, as the amount of particulate matter captured by center strainer 26 becomes substantial, center strainer 26 can become clogged. As center strainer 26 becomes clogged, the liquid level in strainer device 10 will rise. In order to prevent the liquid from overflowing the strainer device and/or the sink, each of side walls 18 includes a side recess 34 which includes a side opening 36. As those skilled in the art will appreciate, it is preferred that each side wall 18 include a side wall recess 34 and a side opening 36. On the other hand, it is possible to include only one, two or three side recesses 34 and/or side openings 36 without departing from the spirit and scope of the present invention. It is preferable to have more side openings 36 to maximize the secondary exit area for the present invention. While the side openings 36 are shown as being of a rectangular shape, those skilled in the art will appreciate that the side openings could be square, circular or any other shape. Additionally, multiple side openings 36 could be present in a particular side wall without departing from the spirit and scope of the present invention.

Each side opening 36 is preferably covered by a secondary side strainer 38 which, like primary center strainer 28 acts as a filter and is preferably made of a perforated metal plate. Like center strainer 28, side strainer 38 can be made of other straining and filtering materials such as a metallic screen, a metallic or plastic mesh material, or other filtering and straining means known to those skilled in the art. Preferably, the side strainer screening device would have side screen openings 39 sized to prevent the passage of material as small as a tomato seed. The side screen openings 39 preferably have diameters in the range of 0.5–1.5 mm. and more preferably have diameters in the range of 0.9–1.1 mm. Preferably, the side strainer 38 will have between 35 and 95 openings per square centimeter. If a screen mesh-type side strainer 38 is used, it is preferred that the wire used in the screen mesh is in the range of 0.025 to 0.030 inches and, optimally, 0.028 inches in diameter. Additionally, the wire-to-wire opening distance is preferably in the range of 0.04 inches to 0.065 inches and, optimally, 0.0553 inches. Whether using the perforated metal plate or the wire screen mesh, it is preferred that the percentage of openings area will be in the range of 38 to 55% and optimally 44% of the area of the side opening 36. Clearly, the shape of the side strainer preferably will conform to the shape of the side opening 36 and different types of straining devices can be utilized without departing from the spirit and scope of the present invention.

As those skilled in the art will appreciate, side opening 36 is separated from base opening 26 by a portion of the frame 11. Frame 11 is preferably made of a plastic material which is substantially impermeable to liquids. Alternatively, frame 11 could likewise be made of metal or composite materials or other equally resilient materials known to those skilled in the art.

Side strainer 38 can be held in place by any of a number of means including gluing, bonding, welding, riveting, and other fastening means known to those skilled in the art.

Figure 4:
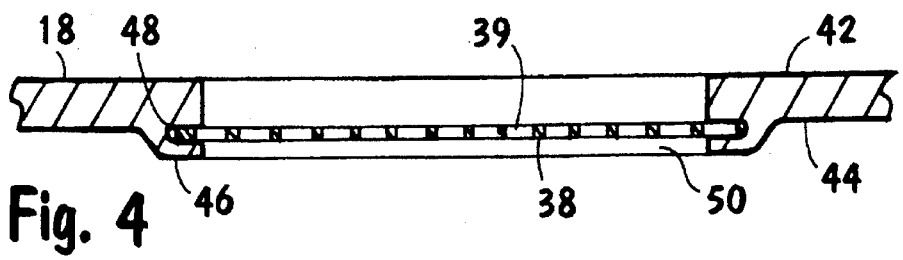
FIG. 4 is a partial cross-sectional view of the side wall area of the present straining device along the line 4—4 shown in FIG. 1.

Referring now to FIG. 4 which shows a partial cross-section of a side wall 18, the side strainer 38 is shown as a perforated metal plate. Importantly, the side wall includes an inner side 42 and an outer side 44. On the outer side 44, the side wall also forms a retaining lip 46. Retaining lip 46 forms a U-shaped retaining recess 48 which cooperatively retains the perforated metal plate side strainer 38 along three of its four outer edges.

Figure 5:
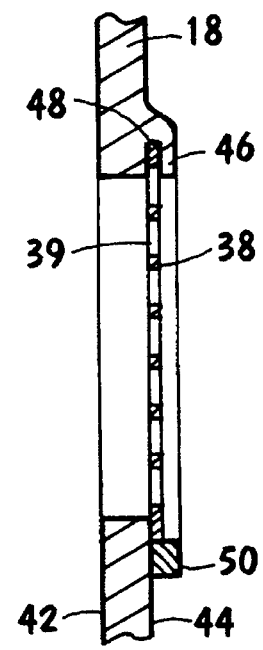
FIG. 5 is a partial cross-sectional view of the side wall area of the present straining device along the line 5—5 shown in FIG. 1.

As is best seen in FIG. 5, the fourth side of the side strainer 38 is retained in place by a retainer bar which is attached to the outer side 44 of the side wall 18. This retainer bar can be bolted, riveted, glued, fastened, bonded, welded, or fastened by any other means known to those skilled in the art to the side wall 18. Placement of the U-shaped retaining recess 48 around three sides of the side strainer 38 and placement of the linear retainer member 50 along the fourth side, effectively contains the outer edges of side strainer 38 and keeps it in a proper position over a side opening 36 in side wall 18. As those skilled in the art will appreciate, should the side opening and/or the side strainer 38 be something other than a substantially four-sided shape, several of the sides could be held in place by the use of a substantially U-shaped retaining recess 48 and could be contained in that configuration using a specially shaped retainer member which conforms to the otherwise unrestrained side of the side strainer without departing from the spirit and scope of the present invention.

Referring again to FIG. 2 and FIG. 3, flange portion 12 is shown. Flange portion 12 includes a tapered portion 52 where the thickness of the flange 12 reduces from the thickness at its main portion 54 down to the thickness at the outer edge 56. The thickness of the flange at main portion 54 is greater than the thickness at outer edge 56 which results in tapered portion 52. The importance of this tapered portion 52 will be readily apparent to those skilled in the art. As those people familiar with floor sinks will readily appreciate, floor sinks are often used as a place into which debris can be swept. As is the case with debris contained in the wastewater, the floor debris also easily clogs drains and piping systems. Accordingly, the present device 10 is usable to prevent the floor sweepings from entering the drain system and thus reduce clogs associated therewith.

Figure 8:
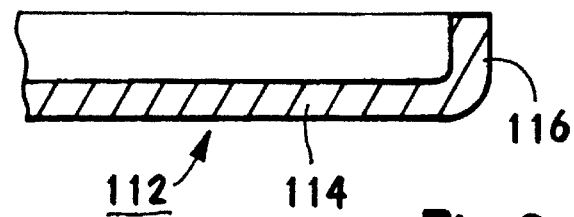
FIG. 8 is a partial cross-sectional view showing an alternative flange portion.

In an alternative embodiment, as is shown in FIG. 8, the flange 112 has a main portion 114 and an upward-turned lip 116. This embodiment would preferably be used in a sink that is recessed relative to its surface environment. With the upturned lip, the strainer sits fully within the recessed area of the sink and does not need the tapered portion shown in the embodiment shown in FIG. 3.

As is best seen in FIGS. 2 and 3, flange 12 can include a grate recess 58 which allows the placement of a grate 60 into the strainer device 10. In this manner, the strainer device 10 can be used in high-traffic areas. Grate 60 can be either a single piece grate covering the entire open inlet of the device or, alternatively, the grate can be two half portions which can be separately removed.

Figure 9:
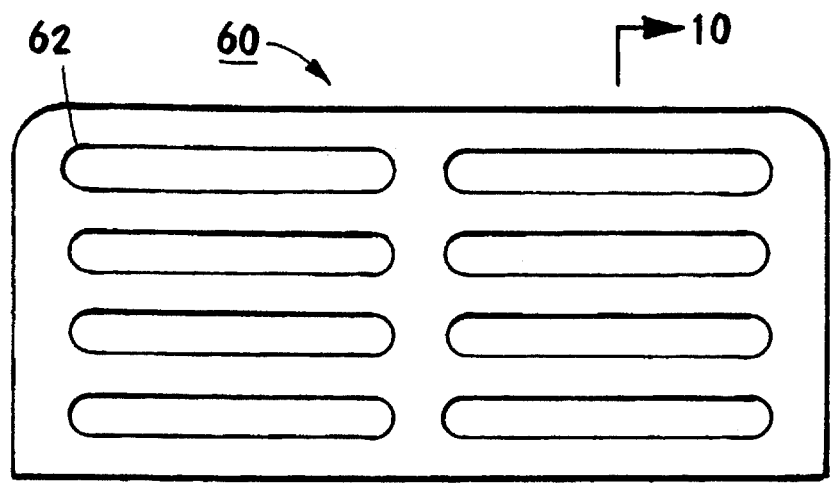
FIG. 9 is a top view of a half grate for the present straining device.
Figure 10:
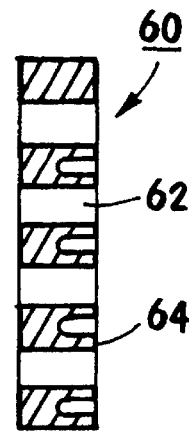
FIG. 10 is a cross-sectional view of the half grate shown in FIG. 9 along the line 10—10.

Referring now to FIG. 9, a half grate is shown and generally designated 60. This grate should be made of a resilient albeit sturdy material such as plastic or other composite material. Grate 60 includes a plurality of openings 62 through which liquids and other matter can pass. As those skilled in the art will appreciate, grate 60 can have a substantially uniform thickness or can include thickened portions or ridges 64 for added strength. Because floor sinks and other receptacles often have piping extending down into the sink, a full piece grate is often not possible and a half grate 60 must be used. In situations where full grate is desirable and possible, either two half grates 60 could be utilized or a single grate having similar dimensions as two half grates could be utilized without departing from the spirit and scope of the present invention. Importantly, the present invention can be utilized with or without the grate 60, although the grate itself can be utilized to strain large items and to prevent them from entering into the recessed portion of device 10.

Figure 6:
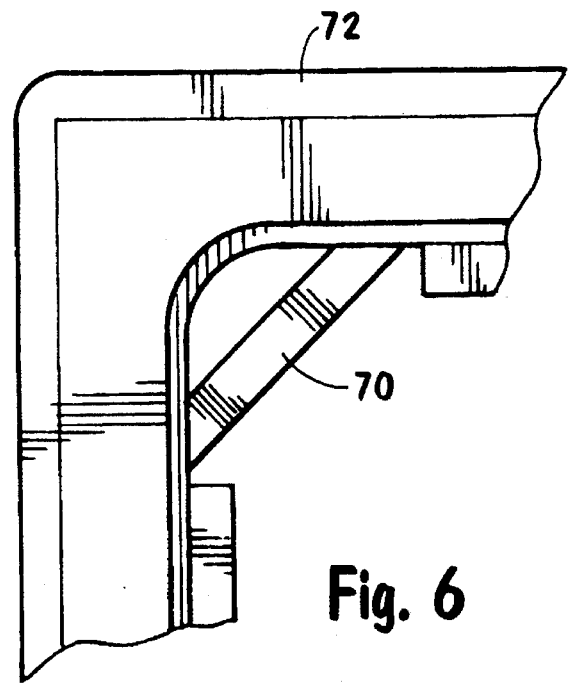
FIG. 6 is a partial cutaway view showing an alternative handle portion.
Figure 7:
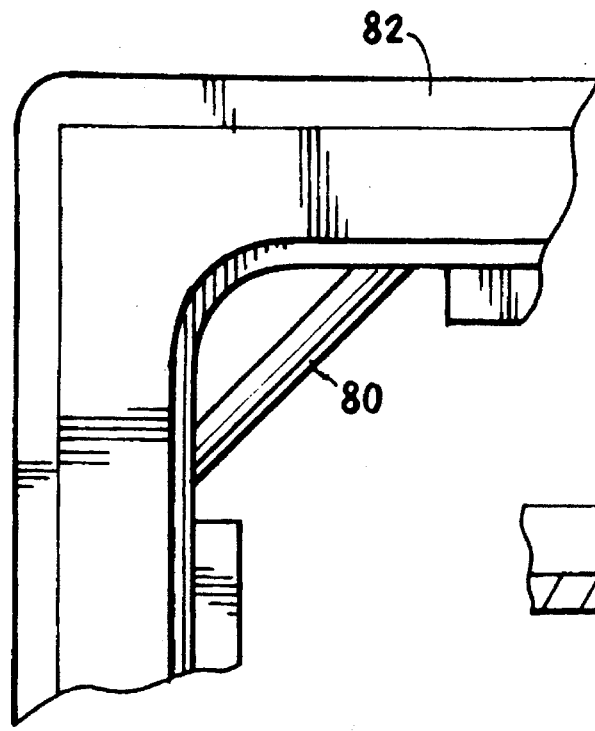
FIG. 7 is a partial cutaway view showing an alternative handle portion.

Referring again to FIG. 2, flange portion 12 also includes a handle 62. This handle 62 is preferably a substantially triangular-shaped plate bonded to the corner between two connected side walls 18. Other suitable embodiments for handle 62 are shown in FIG. 6 and FIG. 7. As is shown in FIG. 6, the handle can be a slat 70 which has a substantially rectangular cross-section. In some instances, it may be preferential that slat 70 be made of a clear plastic material to improve viewability behind the handle. Slat 70 is preferably glued, bonded or welded to flange 72. Handle 62 is preferably coplanar or flush with a plane containing the flanged portion of the straining device. Alternatively, handle 62 can be placed between the plane containing the flanged portion and the plane containing the base portion. In that configuration, the handle is preferably positioned closer to the plane containing the flange than the plane containing the base.

In yet another alternative embodiment, the handle can be made of a circular rod 80 spanning between two sides of flange 82. Preferably, this rod would be glued or bonded or ultrasonically welded to the flange or the adjacent side walls 18. Preferably, the rod will be coplanar or flush with flange 82 or will be between the plane containing the flange 82 and the plane containing the base portion.

Strainer 10, as shown in FIG. 1, has a number of benefits which may or may not be readily apparent from the preceding description. Because of the design utilizing a freely formable frame 11 having openings which are then screened, the device can be formed having a substantially deeper recessed area than the prior art screen-mesh-type strainers. Importantly, this allows the present invention to not only hold more particulate matter, but also prevent the particulate matter from being splashed out of the strainer itself. This splashing often occurs in strainers which do not have very great depth. As the water enters the straining device, particulate matter collected in the base may be impacted and ejected from the strainer device itself. Having substantially more depth in the box portion of the device prevents most of the particulate matter from being ejected from the strainer upon impact by inflowing liquids.

If the flow of water has enough force, some particulate matter still may be ejected from the box portion of the strainer device. For this reason, the flange portion 12 is designed to extend out beyond the periphery of the sink in which the device is installed. In this manner, if the particulate matter is ejected, it will be ejected from not only the device, but also from the sink. Other strainer devices which may be set into the sink itself do not have this same benefit. When material is ejected from those straining devices, material is ejected from the strainer directly into the sink. As was discussed above, the movement of particulate matter from the strainer into the sink is prevented by the overlapping portion of the flange relative to the sink edge.

Another benefit of the present design which is not immediately apparent is that the present device will provide a warning when it becomes clogged. If both the primary outlet and the secondary outlet or outlets become clogged, water will rise in the strainer until it overflows back out through the inlet of the strainer device. As the liquid overflows the strainer device, it will be spilled onto the area surrounding the sink, but not necessarily into the sink itself. As water begins to spread around the sink area, this provides a warning to persons in the vicinity that the screen needs to be removed and cleaned. Again, strainers placed down into the sink itself may not provide this same warning. As they become clogged, the liquid merely overflows the strainer and remains within the sink itself. In this configuration, there is no warning that the strainer itself is clogged and that liquids, including particulate matter, are entering the drain system.

Once installed, the strainer device 10 effectively prevents the passage of particulate matter. Liquid carrying particulate matter or particulate matter itself enters the inlet of the device which is defined by the annular flange portion 12. Liquid is then allowed to exit the primary outlet or base opening 26. As base opening 26 begins to clog, liquid may start to build up in the strainer device 10. Importantly, the particulate matter will tend to remain in the lower portion of the device in the proximity of the center strainer 28. When the center strainer 28 becomes sufficiently clogged, water may rise to levels such that it exits the secondary or side openings 36. While heavy particulate matter may drop into the bottom of the straining device, other particulate matter may come into contact with the secondary or side strainer 38. Because the side strainer 38 has similar characteristics to the center strainer, again particulate matter is prevented from passing through the device and into the drain. In this manner, particulate matter, whether swept into the strainer device or whether carried with wastewater or other liquid, is effectively captured by the strainer device. Because the strainer device has both a primary outlet and a secondary outlet, flow can be maintained for a maximum period of time before the unit needs to be removed and cleaned.

To clean and remove the device, the device is grabbed at handle 62, which is substantially above and separated from the particulate matter captured by the strainer device. In this manner, the person removing the strainer does not need to contact the material captured by the strainer itself.

As those skilled in the art will appreciate, the present preferred embodiment includes a substantially box-shaped retainer portion. On the other hand, the box portion could be rounded to accommodate nonrectangular sinks and receptacles without departing from the spirit and scope of the present invention. With the configuration, the device may have to have modified side portions to accommodate nonplanar side strainers or center strainers. All of these variations are within the scope of the present invention.

While the particular embodiments of the strainer device as herein shown and disclosed in detail are fully capable of obtaining the objects and providing the advantages hereinbefore stated, it is to be understood that they are merely illustrative of the preferred embodiments of the invention and that no limitations are intended to the details of construction or design herein shown or other than as defined in the appended claims.

What is claimed is:

1. A device for preventing the passage of particulate matter into a wastewater drainage system, said device comprising:

a strainer frame including a base portion, an annular flange portion substantially parallel to said base portion and four side walls interconnecting said base portion and said annular flange portion, said annular frame portion defining an inlet, said base portion defining a primary outlet and at least one of said side walls defining a secondary outlet;

a primary filter covering said primary outlet such that said primary filter prevents passage of particulate matter through said primary outlet;

a secondary filter covering said secondary outlet such that said secondary filter prevents passage of particulate matter through said secondary outlet; and a linear handle rigidly attached to said frame, said handle being positioned to be substantially coplanar with said annular flange portion of said frame.

2. The device as recited in claim 1 wherein said primary outlet and said secondary outlet are separated by a portion of said frame which is impermeable to liquids.

3. The device as recited in claim 1 wherein each of said four side walls defines a secondary outlet and each of said outlets is covered by a separate secondary outlet filter.

4. The device as recited in claim 1 wherein said base portion includes a base recess and said primary filter is positioned in said base recess.

5. The device as recited in claim 1 wherein said side wall defining said secondary outlet includes a side recess and said secondary filter is positioned in said side recess.

6. The device as recited in claim 1 wherein said annular flange portion includes a grate recess and a grate including at least one grate opening is placed into said grate recess to restrict access into said box portion.

7. The device as recited in claim 1 wherein said frame is plastic.

8. The device as recited in claim 1 wherein said filter is a screen mesh.

9. The device as recited in claim 1 wherein said filter is a perforated metal plate.

10. The device as recited in claim 1 wherein said handle is metal rod.

11. The device as recited in claim 1 wherein said handle is clear plastic slat having a rectangular cross section.

12. A device for removing particulate matter from a stream of liquid, said device comprising:

a frame including a box portion connected to a flange portion, said box portion including a base and four interconnected side walls, said interconnected side walls being connected to said base, said flange being connected to said box portion at said interconnected side walls;

inlet means for allowing said stream of liquid to enter said box portion, said inlet means being defined by said frame;

primary outlet means for allowing said stream of liquid to exit said box portion, said outlet means being defined by said frame;

primary filter means for preventing said particulate matter from exiting said box portion through said primary outlet means, said primary filter means covering said primary outlet means;

secondary outlet means for allowing said stream of liquid to exit said box portion, said secondary outlet means being defined by said frame and separated from said primary outlet means by a portion of said frame;

secondary filter means for preventing said particulate matter from exiting said box portion through said secondary outlet means, said secondary filter means covering said secondary outlet means; and a handle rigidly connected to said frame, said handle being located between a first plane containing said flange portion and a second plane containing the base.

13. The device as recited in claim 12 wherein said secondary outlet means is located between said first plane and said second plane such that said stream of liquid will exit said box portion through said secondary outlet means when flow through said primary outlet means is restricted by the accumulation of said particulate matter.

14. The device as recited in claim 13 wherein said secondary outlet means comprises a plurality of passageways defined by said interconnected sidewalls and said secondary filter means comprises a separate perforated plate covering each of said plurality of passageways.

15. A device for removing particulate matter from a stream of liquid, said device comprising:

a frame including a base portion, an annular flange portion substantially parallel to said base portion and four side walls interconnecting said base portion and said annular flange portion;

an inlet defined by said annular flange portion;

a primary outlet defined by said base portion;

a secondary outlet defined by one of said side walls;

a primary filter covering said primary outlet such that said primary filter prevents passage of particulate matter through said primary outlet means;

a secondary filter covering said secondary outlet such that said secondary filter prevents passage of particulate matter through said secondary outlet; and a retaining lip surrounding a portion said secondary outlet;

a retaining recess defined by said retaining lip and said side wall defining said secondary outlet, said secondary filter being positioned in said retaining recess;

a retainer member surrounding a portion of said secondary outlet, said retainer member cooperatively engaging said secondary filter to retain said secondary filter in said retaining recess.

16. The device as recited in claim 15 wherein said retaining recess is U-shaped and said retaining member is a linear bar.

17. The device as recited in claim 15 wherein said secondary outlet is located between a first plane containing said flange portion and a second plane containing the base such that said stream of liquid will exit said box portion through said secondary outlet when flow through said primary outlet is restricted by the accumulation of said particulate matter.

18. The device as recited in claim 15 wherein said annular flange portion has main portion, an outer edge, a main thickness at said main portion and an outer edge thickness at said outer edge, said main thickness being greater than said edge thickness such that said flange is tapered toward said outer edge.

19. The device as recited in claim 15 further comprising a handle rigidly attached to said frame, said handle being positioned to be substantially flush with said flange portion.

20. The device as recited in claim 19 wherein said handle is a triangular shaped plate fixedly attached between two of said side walls.

* * * * *